United States Patent
Yang

(10) Patent No.: US 11,588,316 B2
(45) Date of Patent: Feb. 21, 2023

(54) CIRCUIT WITH TIMING FUNCTION AND LEAKAGE PROTECTION PLUG

(71) Applicant: DongGuan City TuoCheng Industries Co., Ltd., Dongguan (CN)

(72) Inventor: Juntuo Yang, Dongguan (CN)

(*) Notice: Subject to any disclaimer, the term of this patent is extended or adjusted under 35 U.S.C. 154(b) by 165 days.

(21) Appl. No.: 17/223,162

(22) Filed: Apr. 6, 2021

(65) Prior Publication Data

US 2022/0231498 A1 Jul. 21, 2022

(30) Foreign Application Priority Data

Jan. 20, 2021 (CN) .......................... 202120159263.2

(51) Int. Cl.
*H02H 3/16* (2006.01)
*H02H 3/14* (2006.01)
*H01H 47/00* (2006.01)
*H01R 13/652* (2006.01)
*H01R 13/713* (2006.01)

(52) U.S. Cl.
CPC ............ *H02H 3/14* (2013.01); *H01H 47/001* (2013.01); *H01R 13/652* (2013.01); *H01R 13/7135* (2013.01); *H02H 3/162* (2013.01)

(58) Field of Classification Search
CPC ........ H02H 3/14; H02H 3/162; H01H 47/001; H01R 13/7135; H01R 13/652
See application file for complete search history.

(56) References Cited

U.S. PATENT DOCUMENTS

| 6,958,895 B1* | 10/2005 | Radosavljevic | ....... H02H 3/335 335/15 |
| 2015/0326003 A1* | 11/2015 | Yu | ............................ H02H 3/16 361/42 |
| 2019/0165563 A1* | 5/2019 | Epee | ...................... H02H 3/331 |
| 2019/0331734 A1* | 10/2019 | Hanrahan | .......... G01R 31/3274 |

FOREIGN PATENT DOCUMENTS

CN 112382546 A * 2/2021
WO WO-2018120943 A1 * 7/2018

* cited by examiner

*Primary Examiner* — Harry R Behm

(57) ABSTRACT

Disclosed are a circuit with a timing function and a leakage protection plug. An output terminal of a timing chip U2 is connected to an isolating switch U3; the isolating switch U3 is connected to a rectifier module D3; the rectifier module D3 is connected to a circuit breaker X1; a switch tube Q4 and the switch tube Q3 are connected to a resistor R21, and a second switch terminal of the switch tube Q4 is grounded; an output terminal of a zero sequence current transformer is connected to a first input terminal of a microprocessor U1; and an output terminal of the microprocessor U1 is connected to a control terminal of the switch tube Q4. The leakage protection plug of this disclosure has both leakage protection and timing functions.

6 Claims, 5 Drawing Sheets

CIRCUIT WITH TIMING FUNCTION AND LEAKAGE PROTECTION PLUG

FIELD OF INVENTION

This disclosure relates to the field of leakage protection, in particular to a circuit with a timing function and a leakage protection plug.

BACKGROUND OF INVENTION

Description of the Related Art

In order to protect the safety of users, a leakage protection function is added to many plugs, but these plugs still fail to meet the needs of users well for the reason that users often need to have a timing function (such as turning off the air conditioner or fan during sleep) for the actual use environment of the plugs. Both of the protection and timing functions have become a problem that demands immediate attentions and feasible solutions.

SUMMARY OF THE INVENTION

Therefore, it is a primary objective of this disclosure to solve the problems of the prior art by providing a circuit with the function of timing and leakage protection.

To achieve the aforementioned and other objectives, this disclosure discloses a circuit with a timing function which includes a timing chip U2, an isolating switch U3, a rectifier module D3, a switch tube Q4, a switch tube Q3, a resistor R21, a resistor R26, a resistor R16, a capacitor C11, a zero sequence current transformer, a microprocessor U1 and a circuit breaker X1, characterized in that an output terminal of the timing chip U2 is coupled to a control terminal of the isolating switch U3; an input terminal of the rectifier module D3 is coupled to an external AC power supply; a first switch terminal of the isolating switch U3 is coupled to an output terminal of the rectifier module D3 through the resistor R26; a first switch terminal of the switch tube Q3 is coupled to an output terminal of the rectifier module D3 through the resistor R16; a second switch terminal of the isolating switch U3 and a second switch terminal of the switch tube Q3 are grounded; an output terminal of the rectifier module D3 is coupled to a control terminal of the circuit breaker X1; a terminal of the resistor R21 is coupled to an external AC power supply; a first switch terminal of the switch tube Q4 and a control terminal of the switch tube Q3 are coupled to the other terminal of the resistor R21 separately; a second switch terminal of the switch tube Q4 is grounded; the capacitor C11 is coupled in parallel between the first switch terminal and the second switch terminal of the switch tube Q4; an output terminal of the zero sequence current transformer is coupled to a first input terminal of the microprocessor U1; and an output terminal of the microprocessor U1 is coupled to a control terminal of the switch tube Q4.

In a preferred embodiment, the circuit with a timing function further includes a manual switch S3 having a first switch terminal coupled to the output terminal of the rectifier module D3 and a second switch terminal grounded to the earth.

In a preferred embodiment, the circuit with a timing function further includes a diode D4 and a resistor R22, and the diode D4 has a cathode coupled to the second switch terminal of the switch tube Q3 and an anode coupled to an external AC power supply through a resistor R22, and a second input terminal of microprocessor U1 is coupled to the anode of the diode D4.

In a preferred embodiment, the circuit with a timing function further includes a thyristor SCR, and the second switch terminal of the switch tube Q3 is grounded to the earth through the thyristor SCR, and a control terminal of the thyristor SCR is coupled to the output terminal of the microprocessor U1.

The present disclosure further discloses a leakage protection plug with a timing function, and the leakage protection plug includes a neutral wire, an input terminal and a live wire input terminal, and the neutral wire input terminal is electrically coupled to a neutral wire output terminal, and the live wire input terminal is electrically coupled to a live wire output terminal and the aforementioned circuit, and the circuit breaker X1 is provided for driving the neutral wire input terminal and the neutral wire output terminal to disconnect from each other and driving the live wire input terminal and the live wire output terminal to disconnect from each other.

In a preferred embodiment, the leakage protection plug with a timing function includes a neutral wire pin coupled to the neutral wire input terminal and a live wire pin coupled to the live wire input terminal, and the neutral wire pin has a neutral wire extension column, and the live wire pin has a live wire extension column, and both of the neutral wire extension column and the live wire extension column pass through the zero sequence current transformer separately.

The present disclosure has the following advantageous effect: If there is an electric leakage occurred at both terminals of a circuit breaker or there is a voltage difference between both terminals of the circuit breaker beyond a predetermined time, the circuit breaker will be opened, so that the leakage protection plug will have both the leakage protection function and the timing function.

DESCRIPTION OF THE PREFERRED EMBODIMENTS

Exemplary embodiments are illustrated in reference with the drawings. It is intended that the embodiments and figures disclosed herein are to be considered illustrative rather than restrictive.

Figure 1A:
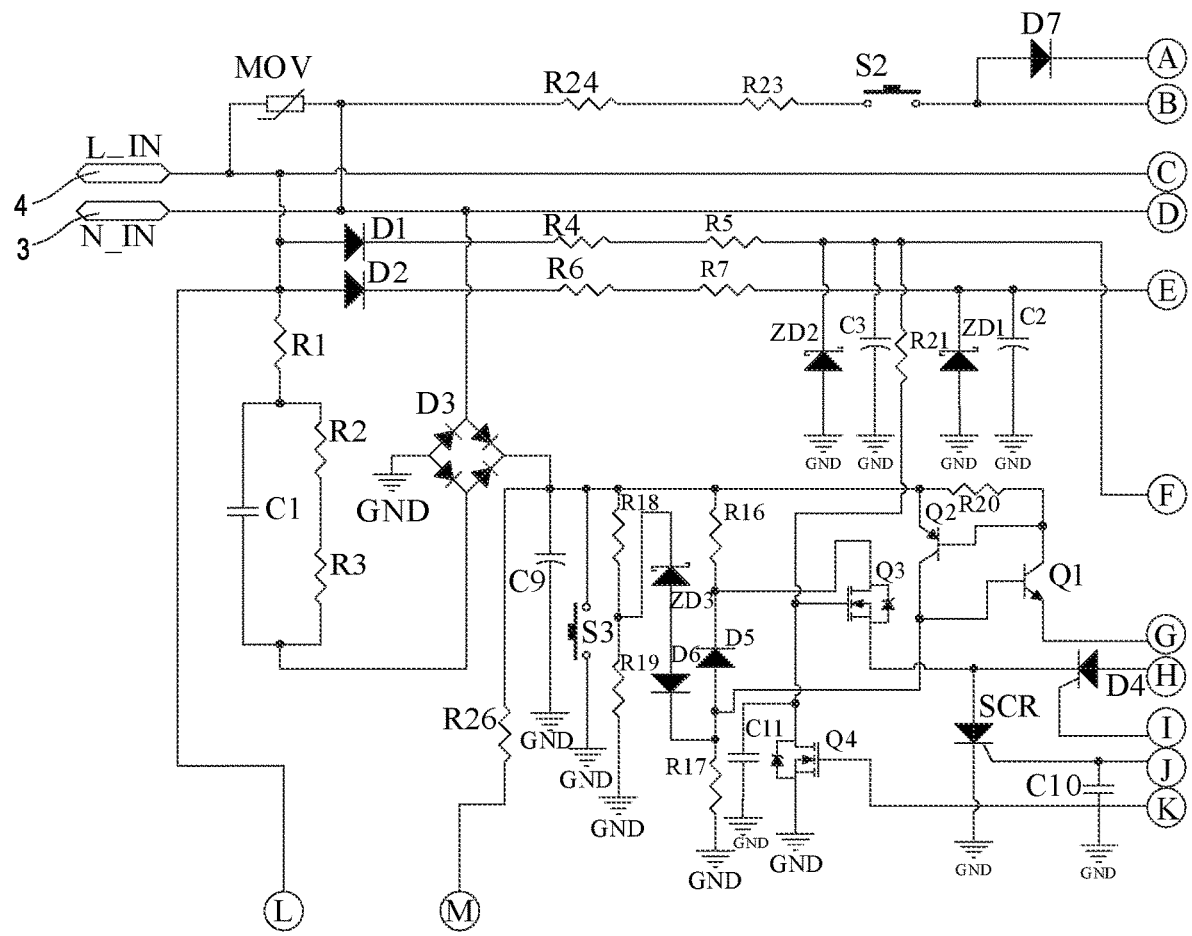
FIGS. 1a, 1b, and 1c are circuit diagrams of this disclosure.
Figure 1B:
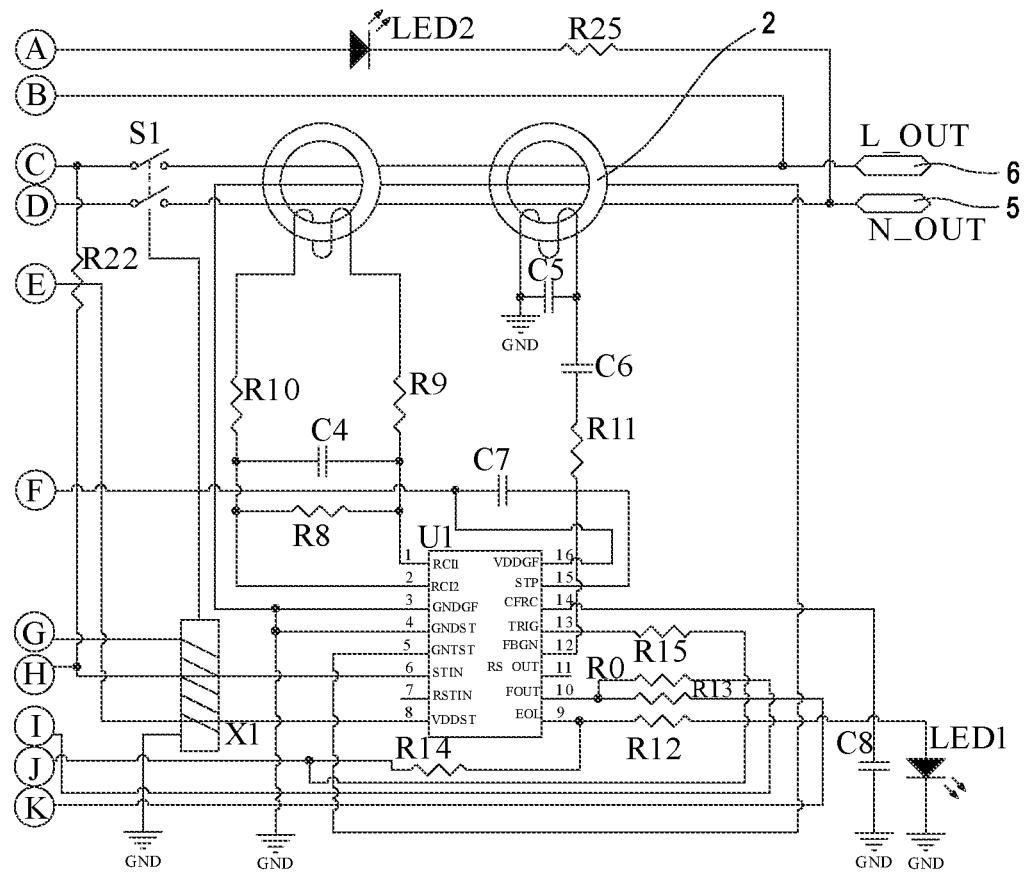
Figure 1C:
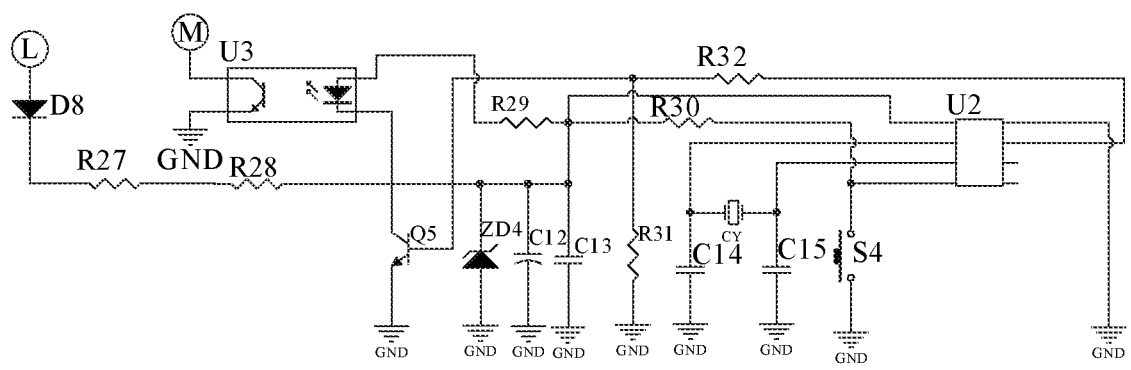

With reference to FIG. 1a~1c for the circuit diagram of a circuit with a timing function in accordance with this disclosure, the circuit with a timing function includes a timing chip U2, an isolating switch U3, a rectifier module D3, a switch tube Q4, a switch tube Q3, a resistor R21, a resistor R26, a resistor R16, a capacitor C11, a zero sequence current transformer, a microprocessor U1 and a circuit breaker X1, characterized in that an output terminal of the timing chip U2 is coupled to a control terminal of the isolating switch U3; an input terminal of the rectifier module D3 is coupled to an external AC power supply; a first switch terminal of the isolating switch U3 is coupled to an output terminal of the rectifier module D3 through the resistor R26; a first switch terminal of the switch tube Q3 is coupled to an output terminal of the rectifier module D3 through the resistor R16; a second switch terminal of the isolating switch U3 and a second switch terminal of the switch tube Q3 are grounded; an output terminal of the rectifier module D3 is coupled to a control terminal of the circuit breaker X1; a terminal of the resistor R21 is coupled to an external AC power supply; a first switch terminal of the switch tube Q4 and a control terminal of the switch tube Q3 are coupled to the other terminal of the resistor R21 separately; a second switch terminal of the switch tube Q4 is grounded; the capacitor C11 is coupled in parallel between the first switch terminal and the second switch terminal of the switch tube Q4; an output terminal of the zero sequence current transformer is coupled to a first input terminal of the microprocessor U1; and an output terminal of the microprocessor U1 is coupled to a control terminal of the switch tube Q4.

The circuit breaker X1 can be an electromagnet and a switch installed in a power circuit, and when there is a voltage difference between both terminals of the circuit breaker X1, the electromagnet is magnetic and attracts the switch in the power circuit to drive the switch to be opened, so as to disconnect the power circuit; when there is no voltage difference between both terminals of the circuit breaker X1, the electromagnet is not magnetic, and the switch in the power circuit to be closed, so as to connect the power circuit. In the working flow of the above circuit, the timing chip U2 outputs an OFF signal in a predetermined time, so that the resistor R26 is not grounded and cannot produce a voltage difference between both terminals of the circuit breaker X1. Within the predetermined time, if the zero sequence current transformer 2 has not detected an electric leakage, the microprocessor U1 will control the switch tube Q4 to turn on, so that the switch tube Q3 will be disconnected. Now, there is no voltage difference between both terminals of the circuit breaker X1. If the zero sequence current transformer 2 has detected an electric leakage, the microprocessor U1 will control the switch tube Q4 to turn off, so that the switch tube Q3 will be conducted. Now, there is a voltage difference between both terminals of the circuit breaker X1; the timing chip U2 outputs an ON signal in a non-predetermined time, so that the resistor R26 is grounded. Now, there is a voltage difference between both terminals of the circuit breaker X1.

In FIG. 1a~1c, the circuit with a timing function further includes a manual switch S3 having an output terminal coupled to the first switch terminal and the rectifier module D3 and a second switch terminal grounded to the earth, so that users can manually reset the circuit breaker X1.

In FIG. 1a~1c, the circuit with a timing function further includes a diode D4 and a resistor R22, and the diode D4 has a cathode coupled to a second switch terminal of the switch tube Q3 and an anode coupled to an external AC power supply through a resistor R22, and a second input terminal of the microprocessor U1 is coupled to an anode of the diode D4. In an embodiment, the circuit with a timing function performs an automatic test from time to time. In the testing process, the microprocessor U1 controls the switch tube Q4 to be disconnected, so that the switch tube Q3 is conducted. If the switch tube Q4 and the switch tube Q3 are not damaged, the diode D4 will be conducted when the external AC power supply is positive, and the input terminal of the microprocessor U1 will be set to a low level, and the diode D4 will be disconnected when the voltage of the external AC power supply is negative, and the input terminal of the microprocessor U1 will be suspended, which is equivalent to be set to a high level. In other words, the input terminal of the microprocessor U1 will be switched between the high and low levels if the components are normal. In the other hand, if the switch tube Q4 and the switch tube Q3 are damaged, the switch tube Q3 will keep remaining at the conducted status. Now, there is no voltage drop at both terminals of the diode D4, so that the diode D4 will not be conducted, and the input terminal of the microprocessor U1 will be suspended and will remain at the high level for a long time. In the aforementioned embodiment, the components for driving the circuit breaker are self-checked regularly, which allows users to detect any abnormal condition of the components at an early stage, and protects the safety of electrical equipment and users.

In FIG. 1a~1c, the circuit with a timing function further includes a thyristor SCR, and the second switch terminal of the switch tube Q3 is grounded to the earth through the thyristor SCR, and the control terminal of the thyristor SCR is coupled to the output terminal of the microprocessor U1. Therefore, the microprocessor U1 can further control the circuit breaker X1 through the thyristor SCR.

Figure 2:
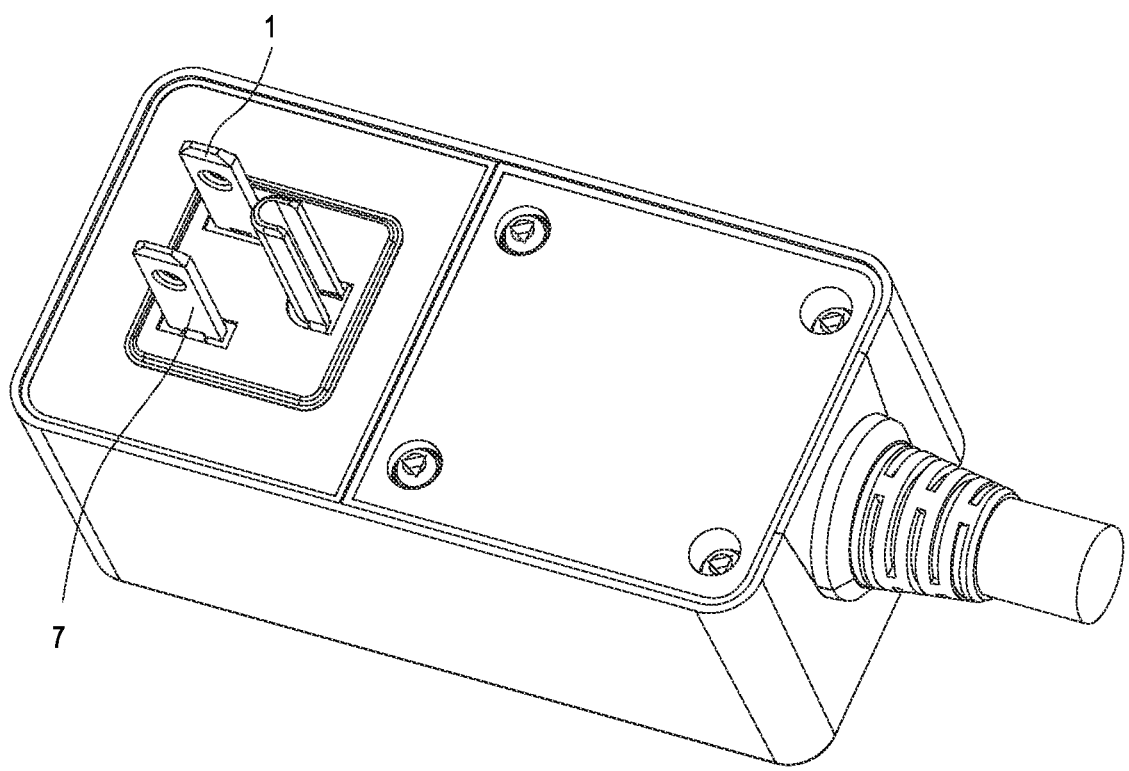
FIG. 2 is a perspective view of a of this disclosure.
Figure 3:
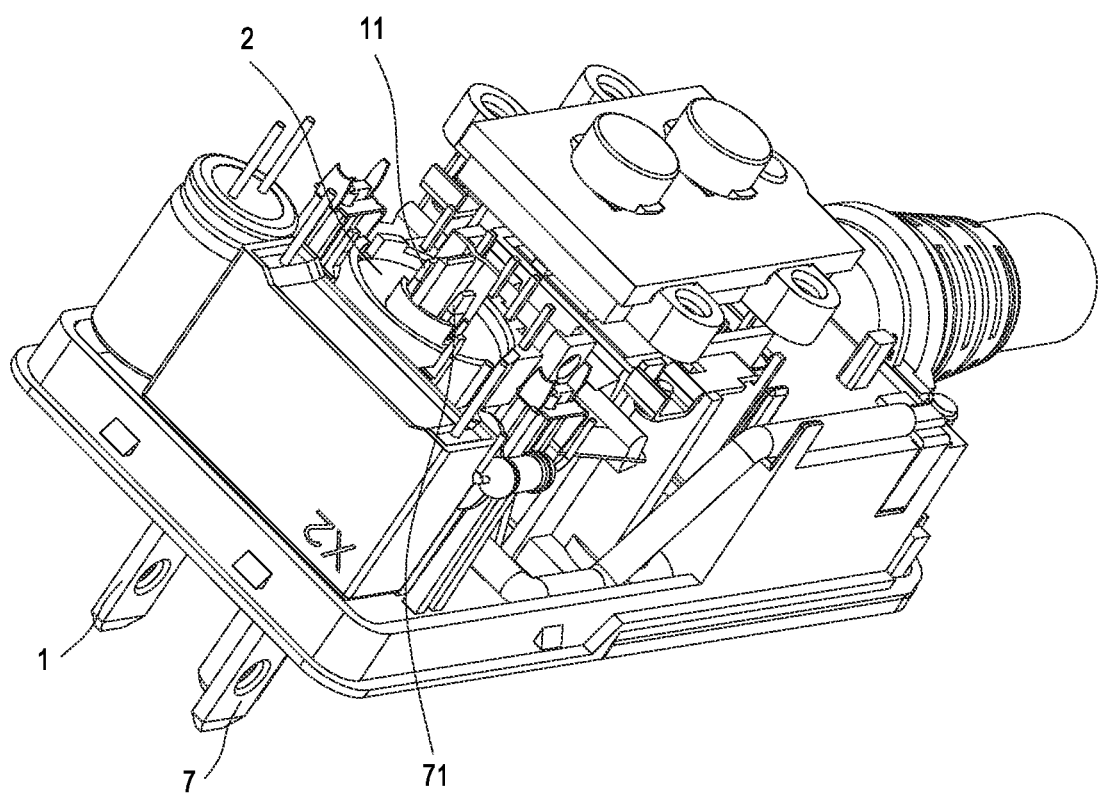
FIG. 3 is a schematic view showing the internal structure of a leakage protection plug of this disclosure.

In FIGS. 2 and 3, the leakage protection plug with a timing function includes a neutral wire input terminal 3, a live wire input terminal 4, a neutral wire output terminal 5 electrically coupled to the neutral wire input terminal 3, a live wire output terminal 6 electrically coupled to the live wire input terminal 4, and the aforementioned circuit, and the circuit breaker X1 is provided for driving the neutral wire input terminal 3 and the neutral wire output terminal 5 to disconnect from each other, and driving the live wire input terminal 4 and the live wire output terminal 6 to disconnect from each other, so that the leakage protection plug has both the leakage protection function and the timing function. Specifically, the neutral wire input terminal 3 is provided for coupling a neutral wire of an external AC power supply, and the live wire input terminal 4 is provided for coupling a live wire of the external AC power supply.

In FIG. 3, the leakage protection plug with a timing function includes a neutral wire pin 7 coupled to the neutral wire input terminal 3 and a live wire pin 1 coupled to the live wire input terminal 4, and the neutral wire pin 7 has a neutral wire extension column 71, and the live wire pin 1 has a live wire extension column 11, and the neutral wire extension column 71 and the live wire extension column 11 pass through the zero sequence current transformer 2 separately to achieve the effect of using the zero sequence current transformer 2 to check an electric leakage of the neutral wire and the live wire through a simple structure.

While the invention has been described by means of specific embodiments, numerous modifications and variations could be made thereto by those skilled in the art without departing from the scope and spirit of the invention set forth in the claims.

What is claimed is:

1. A circuit with a timing function, comprising a timing chip U2, an isolating switch U3, a rectifier module D3, a switch tube Q4, a switch tube Q3, a resistor R21, a resistor R26, a resistor R16, a capacitor C11, a zero sequence current transformer, a microprocessor U1 and a circuit breaker X1, characterized in that an output terminal of the timing chip U2 is coupled to a control terminal of the isolating switch U3; an input terminal of the rectifier module D3 is coupled to an external AC power supply; a first switch terminal of the isolating switch U3 is coupled to an output terminal of the rectifier module D3 through the resistor R26; a first switch terminal of the switch tube Q3 is coupled to an output terminal of the rectifier module D3 through the resistor R16; a second switch terminal of the isolating switch U3 and a second switch terminal of the switch tube Q3 are grounded; an output terminal of the rectifier module D3 is coupled to a control terminal of the circuit breaker X1; a terminal of the resistor R21 is coupled to the external AC power supply; a first switch terminal of the switch tube Q4 and a control terminal of the switch tube Q3 are coupled to the other terminal of the resistor R21 separately; a second switch terminal of the switch tube Q4 is grounded; the capacitor C11 is coupled in parallel between the first switch terminal and the second switch terminal of the switch tube Q4; an output terminal of the zero sequence current transformer is coupled to a first input terminal of the microprocessor U1; and an output terminal of the microprocessor U1 is coupled to a control terminal of the switch tube Q4.

2. The circuit with a timing function as claimed in claim 1, further comprising a manual switch S3 having a first switch terminal coupled to the output terminal of the rectifier module D3 and a second switch terminal grounded to the earth.

3. The circuit with a timing function as claimed in claim 1, further comprising a diode D4 and a resistor R22, and the diode D4 having a cathode coupled to the second switch terminal of the switch tube Q3 and an anode coupled to an external AC power supply through a resistor R22, and a second input terminal of microprocessor U1 being coupled to the anode of the diode D4.

4. The circuit with a timing function as claimed in claim 1, further comprising a thyristor SCR, and the second switch terminal of the switch tube Q3 being grounded to the earth through the thyristor SCR, and a control terminal of the thyristor SCR being coupled to the output terminal of the microprocessor U1.

5. A leakage protection plug with a timing function, comprising a neutral wire an input terminal, a live wire input terminal, and a neutral wire input terminal electrically coupled to a neutral wire output terminal, and the live wire input terminal being electrically coupled to a live wire output terminal and the circuit as claimed in claim 1, and the circuit breaker X1 being provided for driving the neutral wire input terminal and the neutral wire output terminal to be disconnected from each other, and driving the live wire input terminal and the live wire output terminal to be disconnected from each other.

6. The leakage protection plug with a timing function as claimed in claim 5, further comprising a neutral wire pin coupled to the neutral wire input terminal and a live wire pin coupled to the live wire input terminal, and the neutral wire pin having a neutral wire extension column, and the live wire pin having a live wire extension column, and both of the neutral wire extension column and the live wire extension column passing through the zero sequence current transformer separately.

* * * * *